US005871857A

United States Patent [19]

Alhamad

[11] Patent Number: 5,871,857

[45] **Date of Patent: *Feb. 16, 1999**

[54] FIRE RESISTANT CONSTRUCTION BOARD

[76] Inventor: Shaikh Ghaleb Mohammad Yassin Alhamad, P.O. Box 31590, Riyadh, 11418, Saudi Arabia

[ * ] Notice: The portion of the term of this patent subsequent to Mar. 19, 2008, has been disclaimed.

[21] Appl. No.: 633,940

[22] Filed: Dec. 26, 1990

Related U.S. Application Data

[63] Continuation-in-part of Ser. No. 280,317, Dec. 6, 1988, abandoned.

[51] Int. Cl.[6] .......... B32B 13/06

[52] U.S. Cl. .......... 428/703; 428/140; 428/920; 428/921

[58] Field of Search .......... 428/256, 703, 428/920, 921, 140

[56] References Cited

U.S. PATENT DOCUMENTS

| | | | |
|---|---|---|---|
| 312,864 | 2/1885 | Kinney | 52/67 |
| 600,212 | 3/1898 | Woodman | 169/50 |
| 767,723 | 8/1904 | Terpening | 428/256 |
| 869,116 | 10/1907 | Wade | 428/256 |
| 884,714 | 4/1908 | Clark | 29/6.2 |
| 930,349 | 8/1909 | Clark | 29/6.2 |
| 1,334,796 | 3/1920 | Robinson | 428/256 |
| 1,439,954 | 12/1922 | Emerson | 428/14 |
| 1,472,956 | 12/1923 | Biegler | 428/703 |
| 1,528,310 | 3/1925 | Strzyczkowski | 428/140 |
| 1,694,542 | 12/1928 | Heddan | 52/381 |
| 1,905,541 | 4/1933 | Wiener | 162/159 |
| 2,108,761 | 2/1938 | Bachar | 92/21 |
| 2,183,113 | 12/1939 | Bennett | 169/1 |
| 2,300,137 | 2/1942 | Salisbury | 92/21 |
| 2,340,370 | 2/1994 | Doyle | 169/2 |
| 2,526,066 | 10/1950 | Croce | 106/110 |
| 2,626,864 | 10/1953 | Miscall | 92/3 |
| 2,634,207 | 12/1953 | Miscall | 92/3 |
| 2,705,198 | 3/1955 | Seybold | 92/3 |
| 2,836,863 | 6/1958 | Denker et al. | 428/256 |
| 2,853,394 | 9/1958 | Riddall | 106/114 |
| 2,931,751 | 4/1960 | Du Fresne | 428/256 |
| 3,001,907 | 9/1961 | Bergstrom | 162/175 |
| 3,085,037 | 4/1963 | Lindstaedt et al. | 428/140 |
| 3,095,347 | 6/1963 | Becker | 162/181 |
| 3,192,098 | 6/1965 | Phillips | 428/256 |
| 3,244,632 | 4/1966 | Schulz | 252/62 |
| 3,284,980 | 11/1966 | Dinkel | 52/600 |
| 3,293,725 | 12/1966 | Gunter | 29/6.1 |
| 3,308,597 | 3/1967 | Simonton | 52/635 |
| 3,379,609 | 4/1968 | Roberts | 162/181 |
| 3,437,457 | 4/1969 | Fisher | 29/182.2 |
| 3,454,456 | 7/1969 | Willey | 161/162 |
| 3,459,026 | 8/1969 | Allen | 72/324 |
| 3,465,566 | 9/1969 | Allen | 72/324 |
| 3,498,404 | 3/1970 | Roberts | 181/33 |
| 3,616,173 | 10/1971 | Green | 161/162 |
| 3,825,465 | 7/1974 | Stock | 428/140 |

(List continued on next page.)

FOREIGN PATENT DOCUMENTS

| | | |
|---|---|---|
| 256239 | 2/1988 | European Pat. Off. . |
| 2067105 | 7/1981 | United Kingdom . |
| 554562 | 7/1993 | United Kingdom . |

OTHER PUBLICATIONS

Chesterman, Perlita, 1975, pp. 927–934.

Ladoo et a, Perlite, 1951, pp. 375–378.

Chemical Abstracts, 101:115869m, Lightweight fire–resistant panels.

Chemical Abstracts, 84:1106442e, Light Gypsum Material.

*Primary Examiner*—D. S. Nakarani

*Attorney, Agent, or Firm*—Charles E. Cates; Frank T. Barber

[57] ABSTRACT

A highly fire resistant construction board is produced by embedding a sheet of expanded metal net in a building board made from a water settable inorganic binder. In a preferred embodiment, the wallboard is made from a combination of gypsum, cement, and a particulate mineral filler such as perlite or vermiculite, and contains an embedded layer of expanded metal net made from a magnesium alloy.

8 Claims, 1 Drawing Sheet

U.S. PATENT DOCUMENTS

| | | | |
|---|---|---|---|
| 4,043,862 | 8/1977 | Roberts | 162/135 |
| 4,089,090 | 5/1978 | Westberg | 29/6.1 |
| 4,132,555 | 1/1979 | Barrable | 106/90 |
| 4,149,649 | 4/1979 | Szego | 220/88 |
| 4,242,407 | 12/1980 | Bijen | 428/247 |
| 4,249,669 | 2/1981 | Szego | 220/216 |
| 4,265,317 | 5/1981 | Knecht | 169/50 |
| 4,267,136 | 5/1981 | Bijen | 264/87 |
| 4,299,872 | 11/1981 | Miguel | 428/117 |
| 4,345,001 | 8/1982 | Bijen | 428/286 |
| 4,349,398 | 9/1982 | Kearns et al. | 428/256 |
| 4,361,190 | 11/1982 | Szego | 169/48 |
| 4,454,702 | 6/1984 | Bonilla-Lugo | 52/745 |
| 4,557,961 | 12/1985 | Gorges | 428/117 |
| 4,557,973 | 12/1985 | Ali | 428/404 |
| 4,564,544 | 1/1986 | Burkard | 428/70 |
| 4,621,397 | 11/1986 | Schrank | 29/6.1 |
| 4,767,491 | 8/1988 | Vittone | 156/500 |
| 4,785,602 | 11/1988 | Giulani | 52/309 |
| 4,793,892 | 12/1988 | Miller | 156/549 |
| 4,816,091 | 3/1989 | Miller | 156/42 |
| 4,828,932 | 5/1989 | Morimoto | 428/608 |
| 4,836,472 | 6/1989 | Sutter | 244/114 |
| 5,001,017 | 3/1991 | Alhamad et al. | 428/573 |

Fig. 2
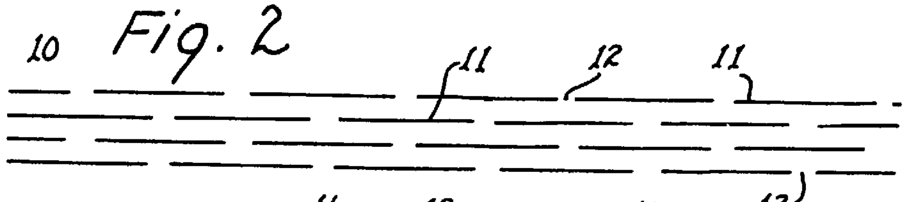
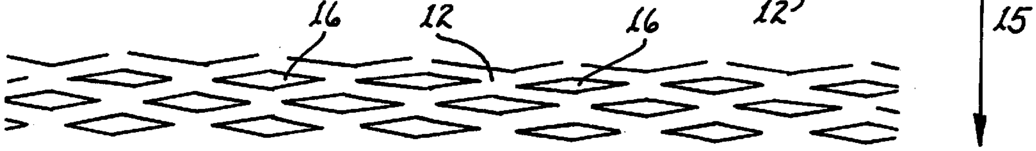
Fig. 3
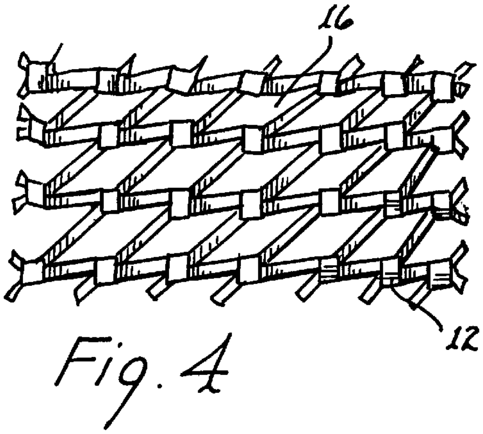
Fig. 4
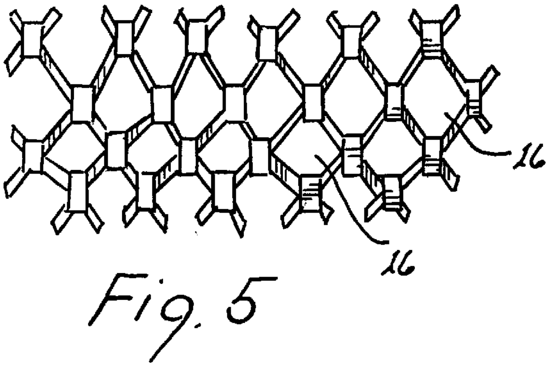
Fig. 5
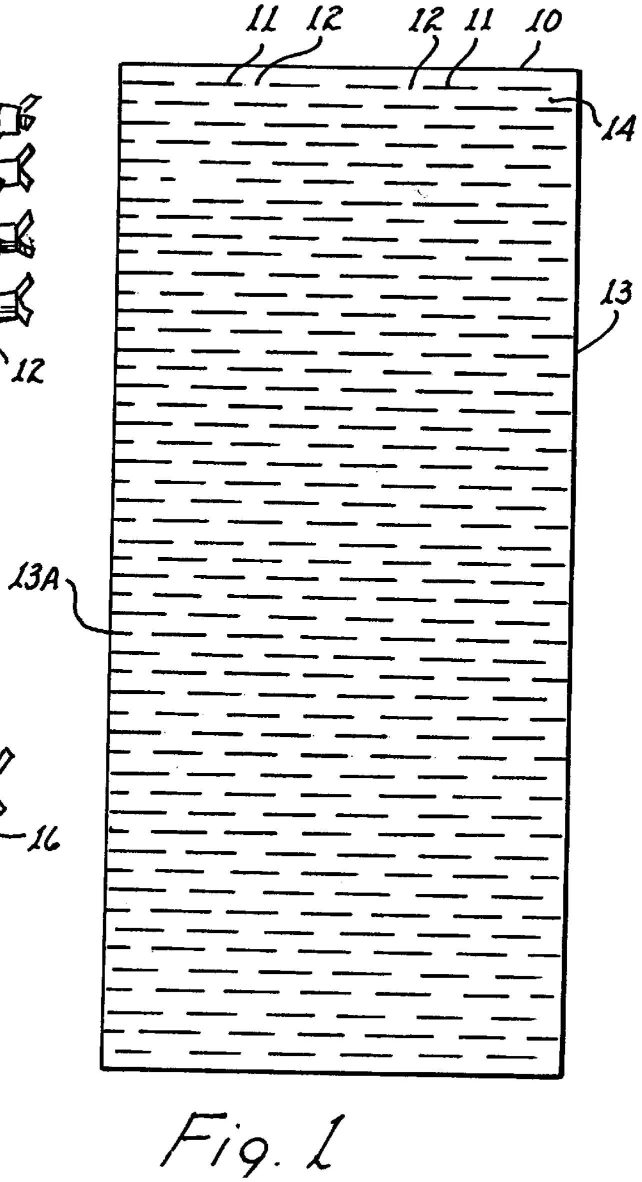
Fig. 1

FIRE RESISTANT CONSTRUCTION BOARD

This application is a continuation-in-part of application Ser. No. 07/280,317, filed Dec. 6, 1988, now abandoned.

FIELD OF THE INVENTION

This invention relates generally to highly fire resistant construction boards which may be used as wall boards or dry wall in the construction industry. More particularly, the invention involves a construction board comprised of a base sheet formed from a water settable inorganic binder which has embedded therein a sheet of expanded metal net.

BACKGROUND AND PRIOR ART

Construction boards known as dry wall, gypsum wallboard, or plaster board, have been used for many years as a fire barrier in buildings, particularly housing. As is well known, gypsum board comprising a cast gypsum core with cover sheets of paper or the like may be manufactured by mixing calcined gypsum with water to provide a slurry, which is deposited in a layer on a cover sheet, such as multi-ply paper. Another cover sheet is placed on top of the slurry, so that the slurry is sandwiched between the two cover sheets which become the facings of the resultant gypsum board. After the slurry core has set, the board is cut to desired size (usually in thicknesses of ½" or ⅝") and dried, as in a kiln. In use, the board is applied to walls, ceilings, etc. by means of clips, nails, or adhesives.

Gypsum wallboard of the type described above has certain fire resistant properties, and as a result building codes which require fire resistant construction assemblies in the interest of public safety normally include gypsum wallboard as a component part, to be installed in various parts of buildings. The important part that wallboard plays in the make-up of fireproof buildings is evidenced by the standards that have been set by governmental agencies, building code authorities, insurance companies, and builders and manufacturers associations for the installation and performance of fire resistant wallboard.

In its role as a fire resistant building component, gypsum wallboard on the walls and ceilings is expected to stay in place for some length of time and deter the spread of fire in a burning building. It appears that, when exposed to the heat and flames of a fire, the paper cover sheets first burn off the core. The cast gypsum core calcines to give up its chemically combined water, and the water is slowly released as steam, effectively retarding heat transmission and disintegration of the board for a time as the gypsum is calcined. However, as the gypsum calcines, it loses its inherent set gypsum strength, and as a result there is a substantial shrinkage of the board at sustained high temperature, with consequent cracking. As it shrinks, it progressively pulls away from the supports to which it is fastened and eventually collapses. This allows the fire to spread and attack adjacent parts of the building.

Standard ⅝" gypsum wallboard possesses dimensional stability and strength to resist the high temperatures normally encountered in a burning building for somewhat less than an hour. However, this provides marginal fire resistance which meets established codes only under limited conditions. In order to effect higher ratings, it has been necessary in the past to use extra-thick wallboard which is not only more costly but also more difficult to erect because of its increased weight. As may be expected, there has been a very substantial effort in the industry to produce boards which are not heavier or thicker but which have been modified to provide higher fire ratings.

Thus, for example, a number of U.S. Pat. Nos. (e.g., 2,526,066; 2,681,863; 2,744,022; 2,853,394; 3,616,173; 4,557,973; and 4,564,544) disclose the addition of fibers such as glass fibers, asbestos and mineral wool fibers to the gypsum slurry in the manufacture of the wallboard. The inclusion of these materials is for the purpose of imparting a mechanical binding effect to hold the calcining gypsum together and prevent it from disintegrating when subjected to the heat of a burning building.

Other U.S. Pat. Nos. (e.g., 2,526,066; 2,744,022; 3,454,456; and 3,616,173) disclose the concept of including unexpanded vermiculite in the gypsum slurry, the concept being that the unexpanded vermiculite will expand when the gypsum core is heated, thus offsetting the undesirable shrinkage of the gypsum component. Other patents, such as U.S. Pat. No. 2,853,394 disclose the concept of including expanded perlite in the gypsum slurry to improve fire resistance and enable production of a dense wallboard having high flexural strength.

The above developments have been valuable contributions, resulting in the production of wallboards having fire ratings in the range between one and two hours. However, in spite of the improvements, the loss of human lives and the destruction of property from fire continues at an unacceptable rate, and there is continued intense effort to find ways of increasing the fire resistance of building materials.

It is an object of the present invention to provide a construction board which possesses significantly enhanced fire suppressing properties.

It is another object of the invention to produce a construction board containing a lightweight component which serves not only to dissipate the heat of a building fire but also to strengthen and prevent fragmentation of the core material when subjected to fire.

It is a further object to improve the fire resistance of construction board and enhance the integrity of the board to the extent that the need for cover or facing sheets is eliminated.

Other objects and advantages will become apparent as the specification proceeds.

SUMMARY OF THE INVENTION

This invention is based on the discovery that the fire resistance and strength of construction boards, such as gypsum wallboard, can be significantly enhanced by embedding a sheet of expanded metal net within the board. It has been found that the presence of the expanded metal net effectively dissipates the heat and flame of a fire such as encountered in a burning building, so that the construction board maintains its physical integrity and dimensional stability even after five or six hours of such burning, and consequently performs its function of preventing spread of the fire through the building.

The product of the present invention therefore is a highly fire resistant construction board comprising a base sheet which is formed from a water settable inorganic binder and which has embedded therein a sheet of expanded metal net. In a preferred embodiment, the product comprises a core made from a mixture of gypsum, cement and a particulate mineral filler such as perlite or vermiculite, said core having embedded therein a layer of lightweight expanded metal net made from a slitted foil such as magnesium alloy foil.

The invention also comprises a method for the production of the highly fire resistant construction board of the type described.

BRIEF DESCRIPTION OF THE DRAWINGS

FIG. 1 is a top view of a slitted metal foil sheet, which can be expanded by stretching to provide the expanded metal net usable in the present invention.

FIGS. 2 through 5 are top views of the expandable metal net, showing the changes in configuration as the slitted sheet is pulled to open up the expanded metal net.

DETAILED DESCRIPTION OF THE INVENTION

In the practice of the invention, the procedure is initiated by making an aqueous slurry of the water settable inorganic binder which is to form the major component of the construction board. The term "water settable inorganic binder" used herein means an inorganic binder which is caused to be set by the action thereon of $H_2O$ in any of its forms, i.e. water, atmospheric moisture, steam, and the like. The water settable inorganic binder may be gypsum alone, but in the preferred embodiment other enhancing components are included, such as cement and a particulate mineral filler (e.g., perlite and/or vermiculite).

The gypsum component may be the conventional calcined gypsum commonly used in the production of gypsum wallboard. It may be either alpha or beta hemihydrate, soluble anhydrite, or mixtures thereof, from natural or synthetic sources. Although it may constitute 100% of the water settable inorganic binder, the embodiment involving the use of other enhancing components usually includes calcined gypsum in concentrations of about 5 to 50% by weight of the aqueous slurry. The preferred concentration of gypsum is in the range of 5 to 25%.

The enhancing components usable with the gypsum include cement and a particulate mineral filler such as expanded perlite or vermiculite. Portland cement is the cement of choice, although other forms such as white cement, black cement, aluminous cement, blast furnace slag cement, and the like may be used. The cement is used in concentrations ranging from 20 to 45% of the aqueous slurry, with concentrations in the range from 25 to 40% by weight being preferred.

The expanded perlite employed in the invention is obtained by heating raw perlite in the known manner to cause expansion of the water of the raw material and vesiculation or "popping" of the rock. The expanded perlite is employed in concentrations of about 10 to 25% by weight of the aqueous slurry, the preferred concentration being from about 15 to 20%. The perlite has been found to improve the fire resistance of the resulting wallboard, as well as provide a lower weight wallboard product. Instead of perlite, other similar particulate mineral fillers such as vermiculite may be used, in the concentrations described above.

In addition to the above ingredients, other additives which are generally added in small amounts to gypsum core formulations to impart desirable properties to the wallboard and facilitate manufacturing can be utilized in this invention. Such additives include materials such as, for example, accelerating agents, retarding agents, dispersing agents, core adhesives, and the like.

In the manufacturing procedure of the present invention, the dry ingredients and water are metered into a mixer in proportions suitable to form a pourable aqueous slurry. The amount of water used for this purpose is generally in the range from 15 to 50% based on the weight of the resulting aqueous slurry, with proportions in the range of 25 to 45% by weight being preferred. After mixing, the slurry is dispensed into a board molding frame having the dimensions of the desired finished wallboard, to partially fill the frame, and then a sheet of expanded metal net is placed over the layer of slurry. Following this, an additional quantity of the slurry is dispensed into the frame to fill it, and the top surface of the material is processed with a forming roll or other appropriate mechanical device for finishing the upper surface of the cast core. It is a feature of the invention that the conventional paper cover sheets are not required in the process, although they may be used if desired for specialized purposes.

The cast board, having the layer of expanded metal net embedded therein, is then allowed to set for a period of time to cure the settable ingredients. During the setting period, which may vary from 1 or 2 hours to as much as 24 or 72 hours, depending upon the nature of the settable ingredients, it is desirable to spray with water at intervals, usually every 12 hours. After this, the board is dried, either at ambient temperatures or by passing through dryers, and then removed from the frame, ready for use. Instead of the rather prolonged setting procedure described above, the process may be accelerated by passing the unset cast board through a furnace to accomplish the setting and the drying in a single step, without the necessity of spraying with water, as above. This procedure tends to result in a stronger wallboard which is more resistant to fire, and is preferred if the appropriate furnace equipment is available.

The expanded metal net employed in the present invention is formed by slitting a continuous sheet of metal foil in a specialized manner and then stretching the slitted sheet to convert it to an expanded prismatic metal net having a thickness substantially greater than the thickness of the foil. Referring to the drawings, FIG. 1 shows a sheet of metal foil provided with discontinuous slits appropriate for the present invention. The length and width of the sheet may be chosen from any number of practical dimensions, depending on the size of the wallboard to be produced.

As noted in FIG. 1, sheet 10 is provided with discontinuous slits 11 in spaced apart lines which are parallel to each other but transverse to the longitudinal dimension of the sheet 10. The slits 11 in each line are separated by unslit segments or gaps 12, and it will be noted that the slits 11 in each line are offset from the slits 11 in adjacent lines. Similarly, the gaps 12 in each line are offset from the gaps 12 in adjacent lines. Apparatus for producing the slitted metal foil 10 is described in detail in copending application Ser. No. 280,317, filed Dec. 6, 1988.

When the slitted metal foil as shown in FIG. 1 is stretched by subjecting it to longitudinal tension, it is converted into an expanded metal prismatic net. In the stretching procedure, the horizontal surfaces of foil are raised to a vertical position, taking on a honeycomb-like structure. This conversion is shown in FIGS. 2 through 5 of the drawings. The slitted metal foil 10 is shown in FIG. 2 prior to stretching. When longitudinal tension is applied in the direction of arrow 15, the slits 11 begin to open, and the product assumes the appearance shown in FIG. 3. The application of more tension causes a greater opening of the slits, and the product expands into the honeycomb-like, prismatic form shown in FIG. 4. When even further tension is applied, the configuration reaches its desired end point, as in FIG. 5. The conversion illustrated in FIGS. 2 through 5 is accompanied by an increase in thickness of the product, the final thickness of the honeycomb product being approximately twice the value of the space 14 between each line of slits.

For the wallboard usage of the present invention, it is desired that the metal foil be very thin and that the slits in each line and the spaces between lines be very small. Thus, the thickness of the foil used to produce the metal net should be in the range between 0.028 and 1.0 mm, and the preferred thickness is between 0.028 and 0.2 mm. The length of each slit 11 is in the range between 1 and 2.5 cm, and the unslit sections or gaps 12 between each slit are in the range between 2 to 6 mm long. The distance 14 separating lines of slits may be varied, depending on the thickness desired for the resulting expanded metal net. The distance 14 is ordinarily in the range between 1 and 4 mm, so that the thickness of the resulting expanded net is normally in the range between about 2 and 8 mm. The preferred value for distance 14 is either 1 mm or 2 mm.

The kind of metal used in the metal foil may be selected from a wide number of metals or alloys which may be produced in the form of a thin foil. For the purposes of the present invention, it is preferred to use alloys of magnesium with certain other compatible substances. Thus, for example, it is desirable to use an alloy of magnesium with substances such as aluminum, copper, zirconium, zinc, strontium, Rn(electron), silicon, titanium, iron, manganese, chromium, and combinations thereof. Alloys such as the above have the valuable characteristic of not only being lightweight, strong, elastic, heat-conductive, etc., but also the important characteristic of being nonflammable. A particularly useful combination is the alloy of magnesium with aluminum and copper. Another preferred combination is the alloy of magnesium with zirconium and strontium. To a somewhat lesser degree, alloys in which aluminum is substituted for the magnesium, are useful in the practice of the invention.

Construction board produced in the manner described above, and including a layer of expanded metal net, possesses good flexibility, strength, nailability, and shock resistance. Moreover, it possesses remarkably enhanced fire resistance properties. The enhancement is achieved if the metal net is included in an ordinary sheet of gypsum wallboard with gypsum as the sole water settable binder, but the improvement is significantly increased if the other components such as cement and perlite and the like are included. Thus for example, a standard ⅝" (16 mm) gypsum wallboard which withstands the heat of a blowtorch at 1500 degrees C. for 45 minutes is able to withstand the same treatment for 2 hours when a layer of expanded metal net is included in the board in accordance with the present invention. Further, when a wallboard containing not only gypsum but also cement and perlite and a layer of expanded metal net is subjected to the same blowtorch treatment, the resistance time is significantly increased to over 6 hours. During the blowtorch treatment, the integrity of the wallboard of the present invention is dramatically preserved, with the backside of the board (away from the torch) remaining cool to the touch even in the presence of the extreme heat.

It has been found that, although the proportion of metal net to the overall weight of the board is only minor (i.e., between 0.05–10%), its presence effectively dissipates the heat and flame of the fire, so that the construction board maintains its physical integrity and dimensional stability even after five or six hours of burning. The metal net also serves to strengthen the wallboard and prevent fragmentation, so that the need for supporting paper cover sheets has been eliminated.

Although the invention has been described in specific terms in connection with the production of fire resistant construction board, such as wallboard, it will be understood that the invention is also applicable to other forms of materials, such as ceiling tiles, roofing materials, building tiles, bricks or briquettes, plywood sheets, fiberglass sheets, drapery materials, wallpapers, and the like, wherein the expanded metal net is embedded or otherwise incorporated in the material. It is also within the contemplation of the invention that the expanded metal net itself may be used as a flame-retaining curtain or screen in front of fireplaces, stoves and windows. For any of the foregoing applications, the preferred form of the expanded metal net is an alloy of magnesium, as more particularly described hereinbefore.

The following examples describe specific embodiments which illustrate the invention but should not be interpreted as limiting the scope of the invention.

EXAMPLE 1

An aqueous slurry was prepared by metering the following ingredients into a mixer and mixing:

| | |
|---|---|
| Perlite powder | 1.33 kilograms |
| Perlite #1 | 2.66 kilograms |
| White cement | 9.5 kilograms |
| Gypsum powder | 4.5 kilograms |
| Carbon powder | 8 grams |
| Water | 7.5 liters |

The resultant slurry was deposited as a first layer in a board forming frame designed for the production of a 4'×8' wallboard having a thickness of ⅝". Following this, a 4'×8' sheet of expanded metal net was laid over the first layer of slurry, and a further portion of the slurry was deposited on top of the metal net. The top surface of the slurry was finished with a roller, and the resulting cast board was allowed to set for three days, with water being sprayed on the surface thereof every 12 hours. Finally, the board was dried in the atmosphere for 1 day and then removed from the frame.

The expanded metal net used as above was made from an alloy comprising 0.25% Si, 0.3% Fe, 0.01% Cu, 0.01% Mn, 10% Al, 0.01% Zn, 0.1% Ti, and the remainder Mg. The metal foil was 0.1 mm thick, and in its expanded form the metal net was 2 mm thick.

The wallboard thus produced had a density of 64.8 lbs/cu. ft. and exhibited good flexibility, strength, nailability and shock resistance. It tested out with maximum bending stress of 307 lbs/in$^2$ and a modulus of elasticity of 455 lbs/in$^2$×10$^3$. Whereas most building codes require a uniform horizontal loading equal to 5 lbs/ft$^2$, the board produced in this example showed a value of 13 lbs/ft$^2$.

The board produced in this example was subjected to a blowtorch test to determine its fire resistance rating. In carrying out the test, a 12" by 12" test piece of the board was placed vertically in front of a standard gasoline blowtorch with the torch flame impinging on the surface of the board. The temperature of the board surface at the point of impingement was maintained at 1500 degrees C., and the time required for loss of integrity of the board was determined. In the case of the wallboard of the present Example, the board remained intact for 6 hours.

EXAMPLE 2

An aqueous slurry was prepared by metering the following ingredients into a mixer and mixing:

| | |
|---|---|
| Perlite powder | 0.67 kilograms |
| Perlite #1 | 0.95 kilograms |
| Perlite #3 | 2.5 liters |
| White cement | 3.0 kilograms |
| Gypsum powder | 1.0 kilograms |
| Carbon powder | 33 grams |
| Water | 5.75 liters |

The resultant slurry was formed into a wallboard having a thickness of ½", in the manner set forth in Example 1. The board included an embedded layer of expanded metal net of the type described in Example 1.

The wallboard thus produced had a density of 48 lbs/cu. ft. and exhibited good flexibility, strength, nailability and shock resistance. It tested out with maximum bending stress of 267 lbs/in$^2$; a modulus of elasticity of 191 lbs/in$^2$×10$^3$; and a uniform horizontal loading value equal to 12 lbs/ft$^2$.

The board produced in this example was subjected to a blowtorch test at 1500 degrees C. to determine its fire resistance rating and maintained its integrity for over 6 hours.

EXAMPLE 3

To test the fire resistance of wallboards with and without the embedded sheet of expanded metal net, aqueous slurries were formed of the following materials:

| | Board A | Board B | Board C |
|---|---|---|---|
| White cement | — | — | 1.5 kilo |
| Gypsum powder | 10.0 kilo | 10.0 kilo | 8.5 kilo |
| Water | 2.0 liters | 2.0 liters | 2.0 liters |

Board A was processed into a gypsum wallboard in the standard commercial manner and contained no embedded sheet of expanded metal net. Boards B and C were processed into wallboard using the procedure set forth in Example 1. Both Boards B and C contained an embedded sheet of expanded metal net.

In blowtorch tests at 1500 degrees C., Board A maintained its integrity for 45 minutes. Boards B and C resisted breakdown for 2 hours.

EXAMPLE 4

A 0.8 mm thick sheet of magnesium alloy foil was slit with transverse slits 1.55 mm in length, with gaps of 2.5 mm between each slit and a space of 2.8 mm between each line of slits. The composition of the magnesium alloy foil was 0.25% Si, 0.3% Fe, 0.01% Cu, 0.01% Mn, 10% Al, 0.01% Zn, 0.1% Ti, and the remainder Mg. The slitted sheet was stretched to convert it into an expanded metal net having a thickness of approximately 1.6 mm.

The resulting sheet of expanded metal net was secured as an interior layer between two sheets of ⅜" plywood, and a 12"×12" test piece of the resulting board was subjected to a blowtorch test, as in Example 1. In the test, the front layer of plywood burned off rapidly, but the expanded metal net prevented the flame of the fire from reaching the back layer of plywood, thus preventing spread of the fire.

Although various preferred embodiments of the invention have been described in detail, it will be understood by those skilled in the art that variations may be made without departing from the spirit of the invention.

What is claimed is:

1. A fire resistant construction board comprising a base sheet formed from a water settable inorganic binder and having embedded therein a sheet of expanded metal net made from foil having a thickness in the range from about 0.028 to 0.5 mm.

2. The construction board of claim 1 wherein said water settable binder includes gypsum.

3. The construction board of claim 1 wherein said water settable binder is a mixture of gypsum and a particulate mineral filler.

4. The construction board of claim 3 wherein said particulate mineral filler is perlite.

5. The construction board of claim 3 wherein said particulate mineral filler is vermiculite.

6. The construction board of claim 1 wherein said water settable binder is a mixture of gypsum, cement and a particulate mineral filler.

7. The construction board of claim 1 wherein said expanded metal net is made from a magnesium alloy foil.

8. The construction board of claim 1 wherein said expanded metal net has a thickness of about 2 to 8 mm in its expanded form.

* * * * *